(12) United States Patent
Tobey et al.

(10) Patent No.: US 8,469,428 B1
(45) Date of Patent: Jun. 25, 2013

(54) VEHICLE TRIM ASSEMBLY

(75) Inventors: Jeffrey Tobey, Sterling Heights, MI (US); Hirofumi Itoh, Novi, MI (US); Gunnar Mason, Holly, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/325,880

(22) Filed: Dec. 14, 2011

(51) Int. Cl.
*B60N 3/02* (2006.01)

(52) U.S. Cl.
USPC ............ 296/1.02; 296/187.12; 296/153; 296/146.7

(58) Field of Classification Search
USPC .......... 296/153, 146.7, 1.08, 187.12, 187.05, 296/1.02
See application file for complete search history.

(56) References Cited

U.S. PATENT DOCUMENTS

| | | | |
|---|---|---|---|
| 4,981,323 A | 1/1991 | Dowd et al. | |
| 6,149,224 A | 11/2000 | Tiberia et al. | |
| 7,503,621 B2 * | 3/2009 | Mani | 296/187.05 |
| 7,549,689 B2 * | 6/2009 | Pinkerton et al. | 296/1.02 |
| 7,658,436 B2 * | 2/2010 | Gilleo et al. | 296/153 |
| 7,789,455 B2 * | 9/2010 | Hall et al. | 296/187.05 |
| 7,794,008 B2 | 9/2010 | Hall et al. | |
| 7,828,388 B2 | 11/2010 | Thomas | |

* cited by examiner

*Primary Examiner* — Dennis Pedder
(74) *Attorney, Agent, or Firm* — Global IP Counselors, LLP

(57) ABSTRACT

A vehicle trim assembly includes an interior trim panel and a pull cup. The pull cup includes a main body, an attachment portion and a break-away portion connecting the main body to the attachment portion. The attachment portion is fastened to the interior trim panel. The break-away portion is configured and arranged to separate the main body from the attachment portion in response to a prescribed level of force applied to at least one of the interior trim panel and the pull cup.

20 Claims, 12 Drawing Sheets

VEHICLE TRIM ASSEMBLY

BACKGROUND

1. Field of the Invention

The present invention generally relates to vehicle trim assembly. More specifically, the present invention relates to trim assembly with a pull cup that includes a break-away portion that causes a main body of the pull cup to separate from a corresponding attachment portion in response to a prescribed level of force being applied to the trim assembly.

2. Background Information

Vehicle passenger compartments typically have a plurality of doors, with at least some of the doors including a trim assembly with trim panel, an armrest and a pull cup attached to the arm rest. The pull cup can further fixedly attached to internal structural elements of the door. The pull cup is shaped and dimensioned such that a passenger can grasp the armrest and/or pull cup, with fingers extending into the pull cup. The pull cup is typically made of a material with sufficient rigidity and strength such that the passenger can reliably apply force to the pull cup to close the door.

During a side impact event, where there is sufficient force to deform exterior panels of the door, the trim panel of the trim assembly within the vehicle may also deform thereby absorbing some impact energy. Since the pull cup must have sufficient rigidity to transmit pulling force to the door in order to close the door, the pull cup typically cannot deform to the extent that the trim panel might deform.

SUMMARY

One object of the invention is to provide a trim assembly of a door with a pull cup having a break-away feature such that the pull cup is released from the door and the trim assembly in response to excessive forces being applied to an exterior of the door.

In view of the state of the known technology, one aspect of the present disclosure is to provide a vehicle trim assembly with an interior trim panel and a pull cup. The pull cup includes a main body, an attachment portion and a break-away portion. The break-away portion connects the main body to the attachment portion. The attachment portion is fastened to the interior trim panel. The break-away portion is configured and arranged to separate the main body from the attachment portion in response to a prescribed level of force applied to at least one of the interior trim panel and the pull cup.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
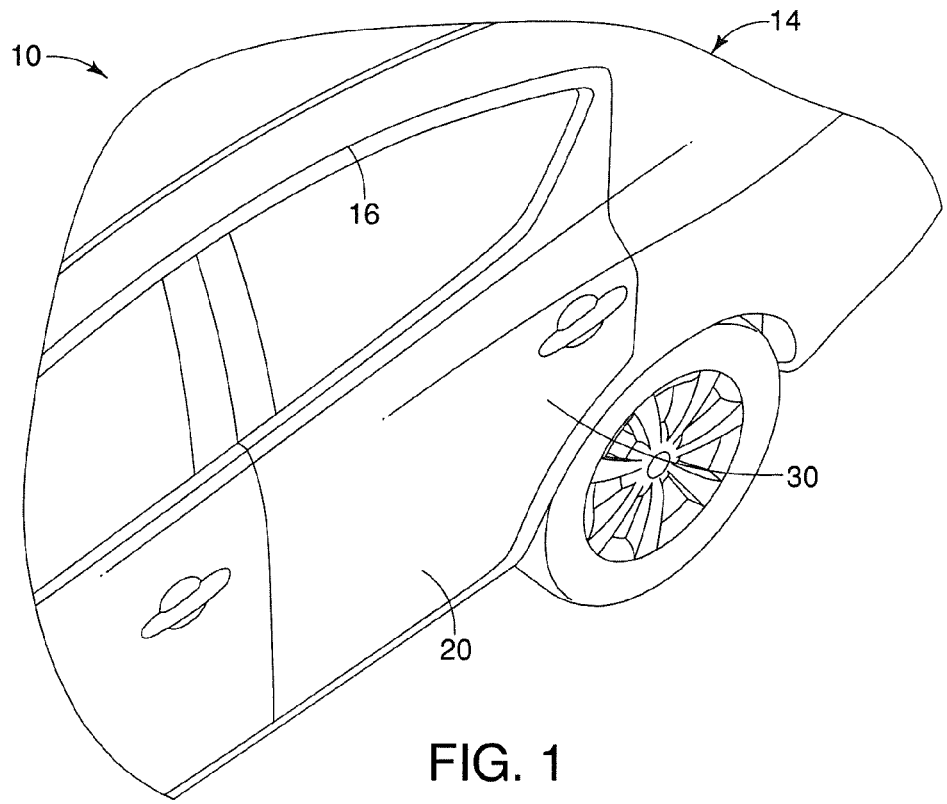
FIG. 1 is a perspective view of a side section of a vehicle showing a rear side door in accordance with one embodiment.
Figure 2:
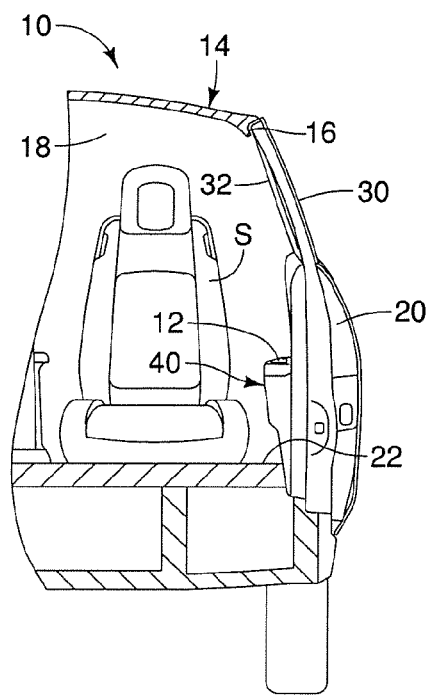
FIG. 2 is a cross-sectional view of the side section of the vehicle showing the rear side door that includes a trim assembly with an armrest and a pull cup in accordance with the one embodiment.
Figure 3:
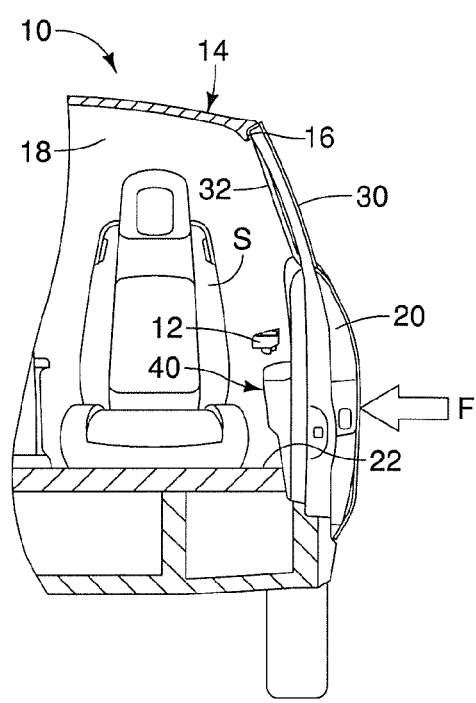
FIG. 3 is another cross-sectional view of the side section of the vehicle showing excessive forces being applied to an exterior of the rear side door causing the pull cup to break-away from the door and the trim assembly in accordance with the one embodiment.

Referring initially to FIG. 1, a vehicle 10 is illustrated in accordance with a first embodiment. As shown in FIGS. 2 and 3, the vehicle 10 includes a pull cup 12 with a break-away feature that is described in greater detail below.

As shown in FIGS. 1-3, the vehicle 10 includes a body structure 14 that defines a door opening 16, a passenger compartment 18 and a door 20. As shown in FIGS. 2 and 3, the body structure 14 includes a floor 22 within the passenger compartment 18 and seats S attached to the floor 22 in a conventional manner.

As indicated in FIGS. 1-4, 9 and 10, the door 20 includes an outer panel 30 (FIGS. 1-3 and 9), an inner panel 32 (FIGS. 2-4, 9 and 10), a window regulator mechanism 34 (FIGS. 4, 9 and 10), a door lever 36 (FIG. 4), a door latch mechanism 38 (FIG. 4) and a trim assembly 40. The outer panel 30 and the inner panel 32 are preferably made of a metallic material, such as steel, iron alloys, combinations of polymer materials and metal materials, polymer or plastic materials or other structural material with the strength and rigidity of metal.

Figure 4:
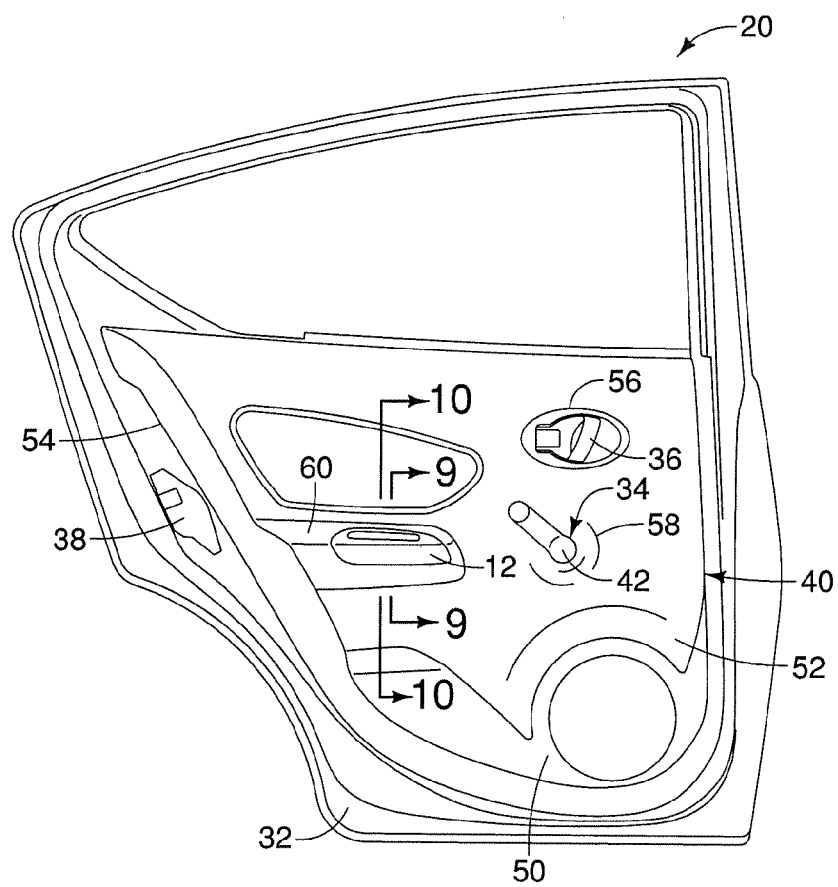
FIG. 4 is an elevation view of an interior of the door with the door removed from the vehicle, showing the trim assembly, including a trim panel with an armrest and the pull cup in accordance with the one embodiment.
Figure 5:
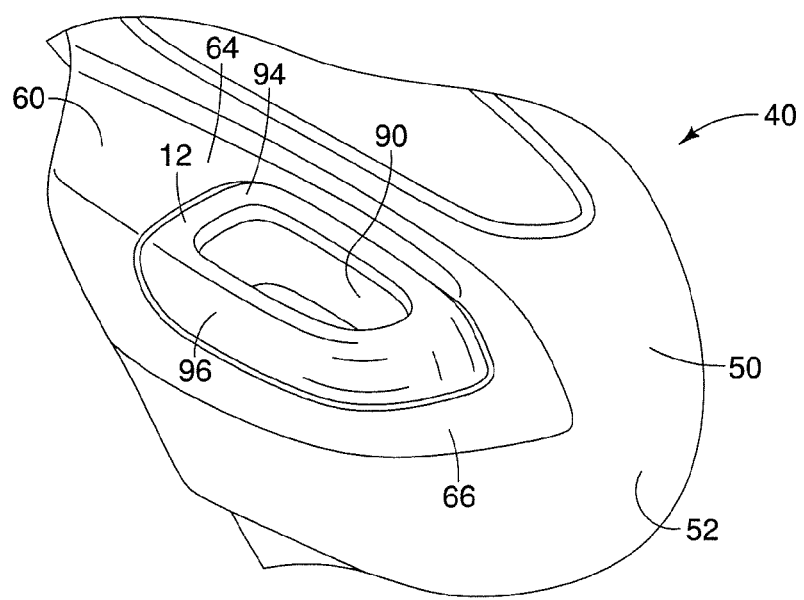
FIG. 5 is a perspective view of the door, showing a portion of the trim panel with the armrest and the pull cup in accordance with the one embodiment.
Figure 6:
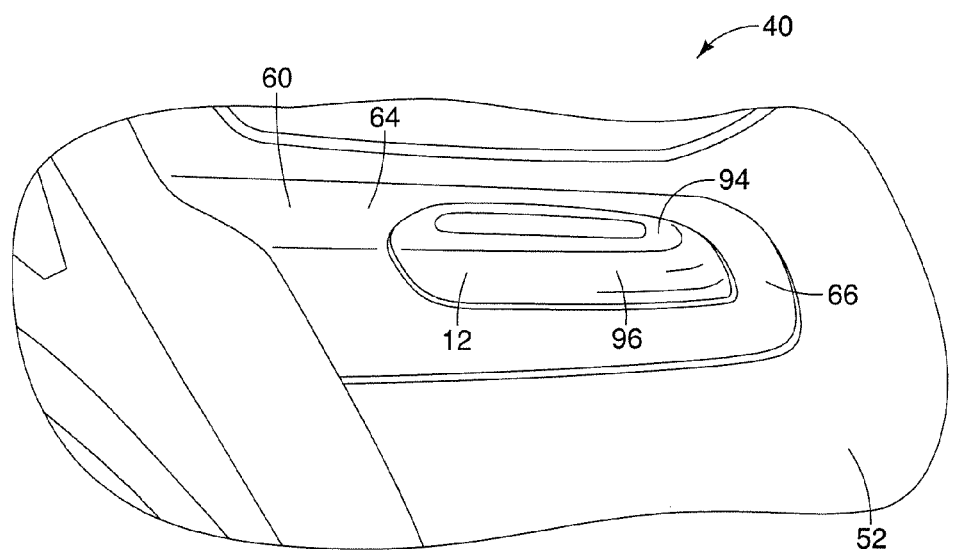
FIG. 6 is another elevation view of the interior of the door, showing a portion of the trim panel, the armrest and the pull cup in accordance with the one embodiment.
Figure 7:
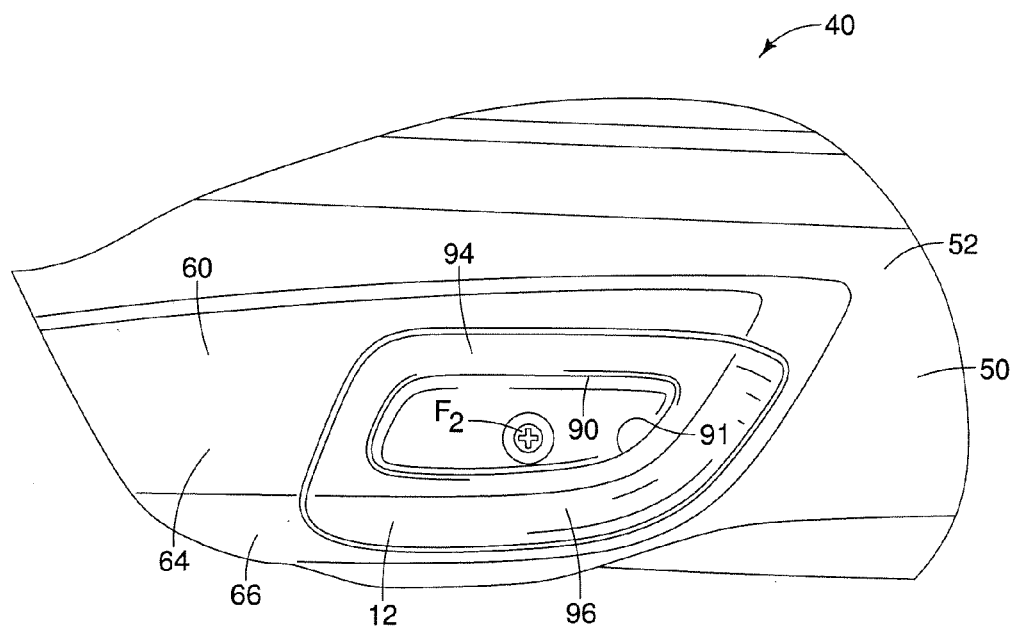
FIG. 7 is a plan view of the interior of the door, showing the portion of the trim panel, the armrest and the pull cup in accordance with the one embodiment.
Figure 9:
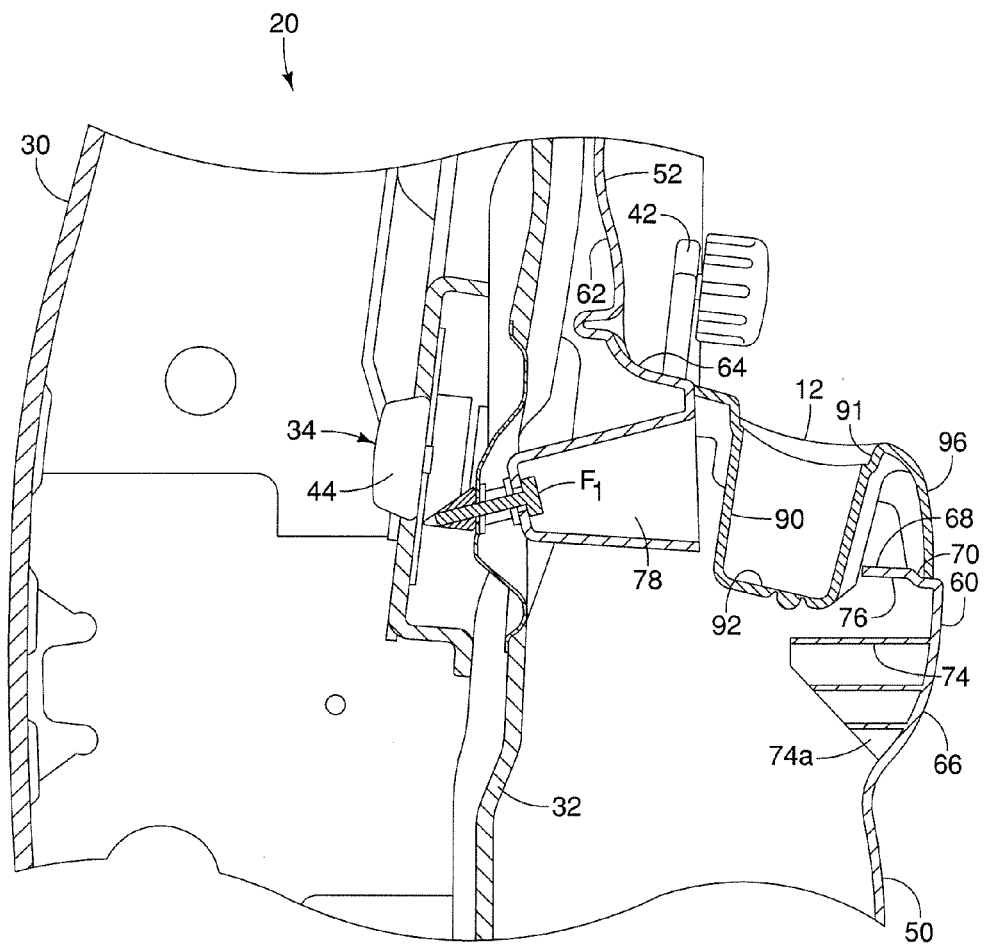
FIG. 9 is a cross-sectional view of a portion of the door taken along the line 9-9 in FIG. 4, showing features of the door including an attachment point between the trim panel and an inner structural panel of the door in accordance with the one embodiment.
Figure 10:
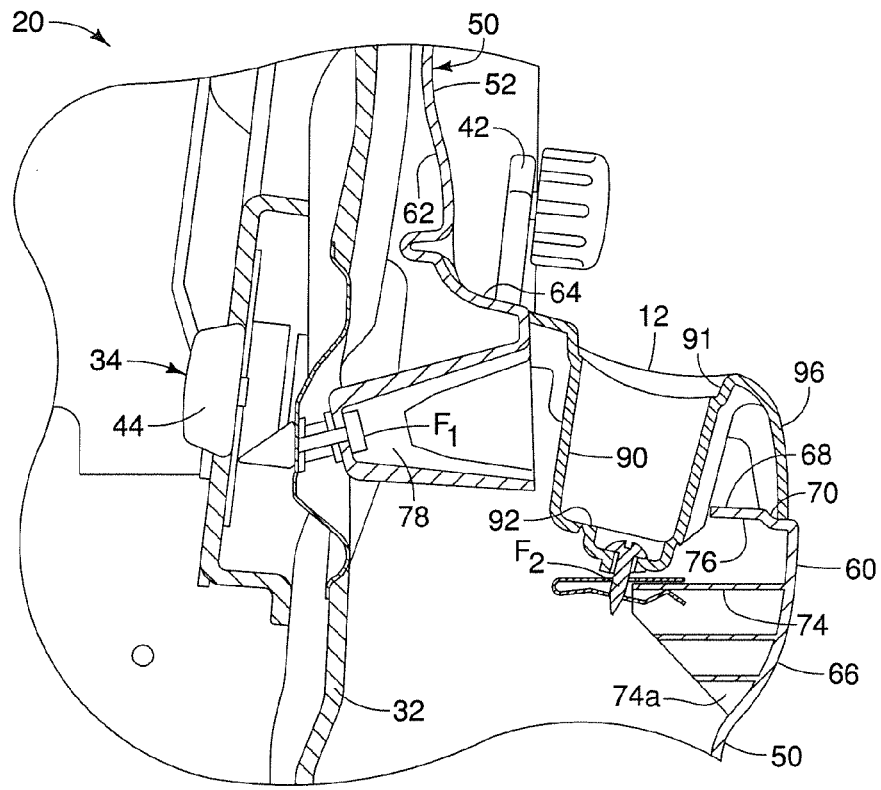
FIG. 10 is another cross-sectional view of a portion of the door taken along the line 10-10 in FIG. 4, showing features of the door similar to those shown in FIG. 9, but further showing an attachment point between the pull cup and the trim panel in accordance with the one embodiment.

As shown in FIG. 1, the outer panel 30 is contoured and dimensioned to conform to an exterior surface of the vehicle 10. As indicated in FIGS. 2-4, the inner panel 32 is fixed to sections of an outer periphery of the outer panel 30, as indicated in FIG. 4. As shown in FIGS. 9 and 10, the inner panel 32 supports portions of the window regulator mechanism 34 and the trim assembly 40.

In the depicted embodiment, the window regulator mechanism 34 is a manually operated mechanism for raising and lowering a window of the door 20. The window regulator mechanism 34 includes a crank handle 42 (see FIG. 4) and a window positioning mechanism 44 supported within the door 20 in a conventional manner, as indicated in FIGS. 9 and 10.

The door lever 36 operates the door latch mechanism 38 in a conventional manner. Since the door 20, the window regulator mechanism 34, the door lever 36 and the door latch mechanism 38 are all conventional features, further description is omitted for the sake of brevity.

As shown in FIGS. 4-10, the trim assembly 40 includes a trim panel 50 and the pull cup 12. The trim panel 50 includes an exposed or inboard surface 52, an outer peripheral edge 54 (FIGS. 4 and 11 only), a latch section 56 (FIGS. 4 and 8), a window crank section 58 (FIGS. 4 and 8), an armrest 60 and a hidden or outboard surface 62 (shown in FIGS. 10 thru 13). The trim panel 50 is a one piece, monolithic member that is preferably molded in a single molding step to include the latch section 56, the window crank section 58 and the armrest 60. The trim panel 50 is contoured and dimensioned to fit the outboard surface 62 against the inner panel 32 of the door 20, as indicated in FIGS. 9 and 10. The trim panel 50 is preferably made of a molded plastic or polymer material that can be covered with a decorative material, such as a textile or leather-like material to provide appropriate aesthetics.

The outer peripheral edge 54 of the trim panel 50 is shaped to complement the shape of the door 20, as indicated in FIG. 4. The latch section 56 includes an opening such that the door lever 36 is exposed through the latch section 56. The window crank section 58 includes a semi-circular recess with an opening that receives a crank shaft (not shown) coupled to the window regulator mechanism 34. The crank handle 42 is attached to the crank shaft in a conventional manner.

Figure 8:
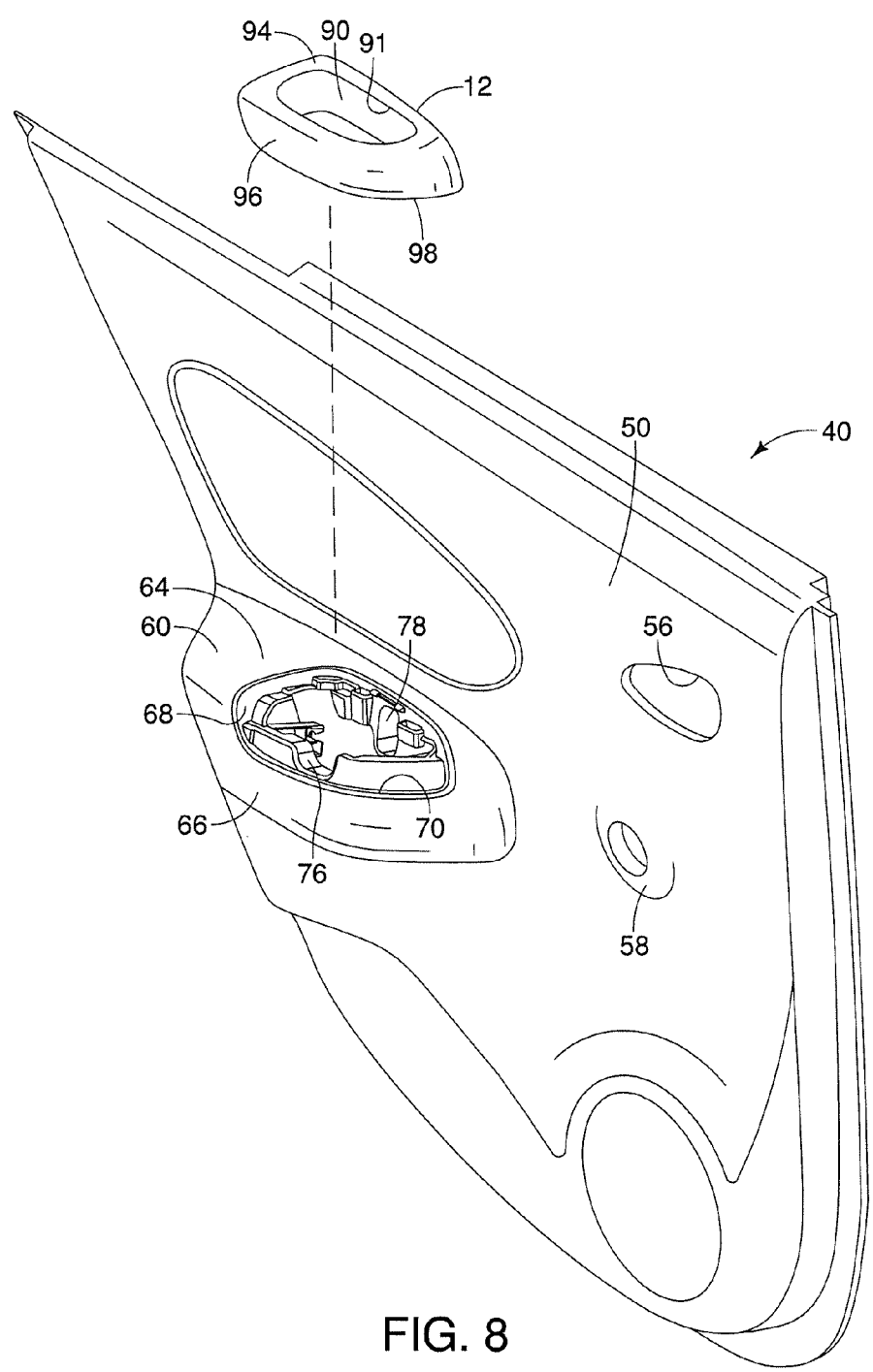
FIG. 8 is an exploded perspective view of the trim assembly removed from the door, showing a portion of the trim panel, the armrest and the pull cup in accordance with the one embodiment.
Figure 11:
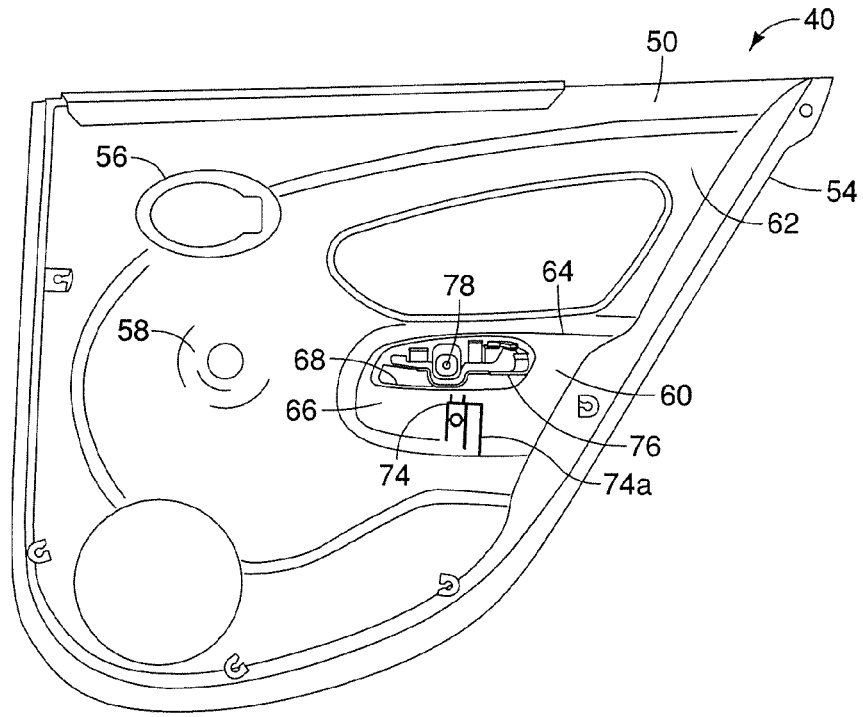
FIG. 11 is an elevation view of the trim panel removed from the door, showing an interior or hidden surface of the trim panel including a flange used to attach the pull cup to the trim panel in accordance with the one embodiment.
Figure 12:
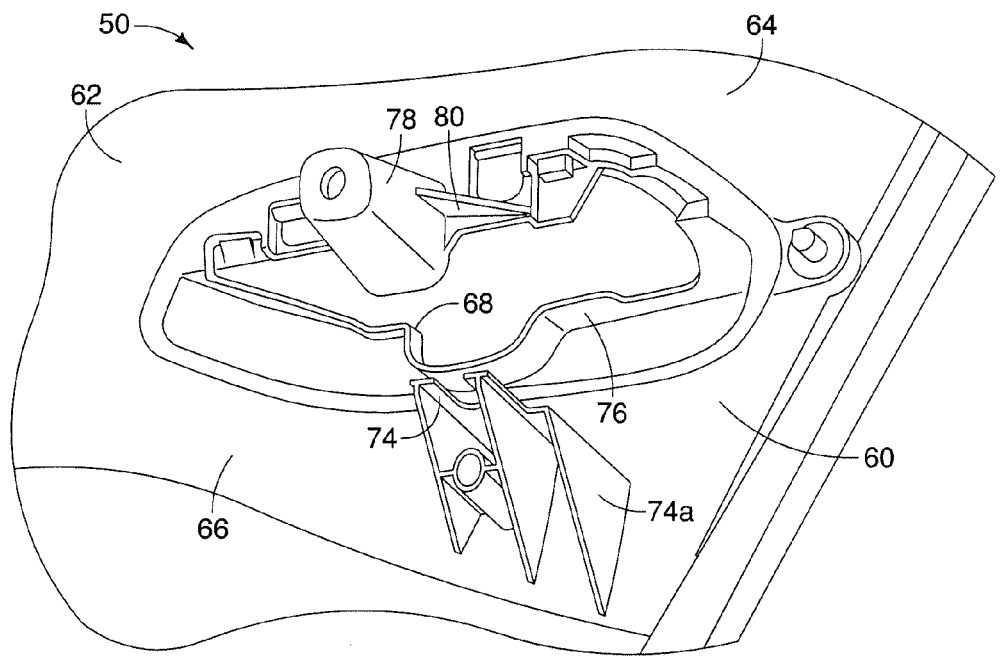
FIG. 12 is perspective view of an interior surface of the trim panel with the pull cup removed, showing features within the armrest including the flange that the pull cup can attach to, and an attachment flange used to attach the trim panel to the door in accordance with the one embodiment.

The armrest 60 is a portion of the trim panel 50 that extends inboard from the remainder of the trim panel 50 in a cantilevered manner. In other words, on the inboard surface 52, the armrest 60 is a convex portion or projection extending into the passenger compartment from the remainder of the trim panel 50. However, as shown in FIGS. 9 and 11, on the outboard surface 62 of the trim panel 50, the armrest 60 defines a large recess, depression or concaved section. As shown in FIGS. 5 thru 8, the armrest 60 has an upper section 64 and a curved side section 66. As shown in FIG. 8, the armrest 60 includes an opening 68 (a recessed section) and a recessed ledge 70 that are shaped to receive and support the pull cup 12, as is described in greater detail below.

The armrest 60 is molded and/or shaped as an integral part of the trim panel 50 to support the arm of a passenger when leaning against it. Consequently, the armrest 60 includes structural elements to provide support for the passenger's arm, as shown in FIGS. 9-13, described further below. These structural elements also provide support for transmitting pulling forces applied to the pull cup 12 by the passenger to close the door 20, from the pull cup 12, through the armrest 60 and trim panel 50 to the door 20. Specifically, the hidden or outboard surface 62 of the trim panel 50 within the armrest 60 includes an attachment bracket 74, a rib 76, a conically shaped attachment section 78 and webs 80. The attachment bracket 74 extends from the outboard surface 62 below opening 68 and includes vertical webs 74a that support the attachment bracket 74. The rib 76 at least partially surrounds the opening 68. The conically shaped attachment section 78 is reinforced by webs 80 above the conically shaped attachment section 78 to the remainder of the trim panel 50 at a location adjacent to the opening 68. Hence, the conically shaped attachment section 78 is visible through the opening 68 with the pull cup 12 removed, as indicated in FIG. 8.

The trim panel 50 is preferably made of a semi-rigid polymer or plastic material that has a first level of flexural rigidity. The pull cup 12 is also preferably made of a semi-rigid polymer or plastic material. However, the pull cup 12 has a second level of flexural rigidity that is greater than the first level of flexural rigidity. In other words, the trim panel 50 is less rigid that the pull cup 12. More specifically, in the event excessive forces are applied to the outer surface of the outer panel 30 of the door 20 (e.g., the door 20 is impacted from the side of the vehicle 10) the trim panel 50 is more likely to undergo deformation than the pull cup 12. It should be understood from the drawings and the description herein that the pull cup 12 requires a greater level of flexural rigidity or stiffness in order to withstand the forces associated with a passenger grasping the armrest 60, inserting fingers or hands into the pull cup 12, and pulling the door 20 shut while applying pulling force on the pull cup 12.

The curved shape of the side section 66 along with the shape of the upper section 64 and the rib 76, provide the armrest 60 with an increased level of rigidity that is greater than the remaining portions of the trim panel 50, but still less rigid that the pull cup 12.

A description of the pull cup 12 is now provided with specific reference to FIGS. 14-21. The pull cup 12 is preferably a molded member made of a plastic or polymer material with a high degree of stiffness or rigidity, in order to withstand repeated forces applied by a passenger closing the door 20. The pull cup 12 basically includes a main body 82, an attachment portion 84 and a break-away portion 86. The main body 82, the attachment portion 84 and the break-away portion 86 are all integrally formed as a single monolithic member or element.

The main body 82 includes a cup section 90 with an upper opening 91, a bottom 92 (a bottom wall portion), an upper section 94 and a contoured side wall 96. A central section of the bottom 92 of the cup section 90 connects to the attachment portion 84 via the break-away portion 86, as is described in greater detail below. The upper section 94 extends between the cup section 90 and the side wall 96. The upper section 94 has a contoured or curved shape that conforms to the overall shape of the upper section 64 of the armrest 60 of the trim panel 50. The side wall 96 is also contoured and extends downward from the upper section 64 defining a lower edge 98. The side wall 96 is spaced apart from the cup section 90 and extends around only a portion of the cup section 90. Specifically, the side wall 96 conceals a front wall and one side wall of the cup section 90. More specifically, the side wall 96 is contoured and dimensioned to fit into the opening 68 in the armrest 60, such that the lower edge 98 of the pull cup 12 mates with the recessed ledge 70 of the armrest 60.

The main body 82 also includes an outer surface 100 and an inner surface 102. Basically, the outer surface 100 is defined on the inside of the cup section 90, the upper section 94 and the side wall 96 of the pull cup 12. More specifically, the outer surface 100 is a surface of the pull cup 12 that is visible when the pull cup 12 is installed in the opening 68 of the armrest 60.

Figure 16:
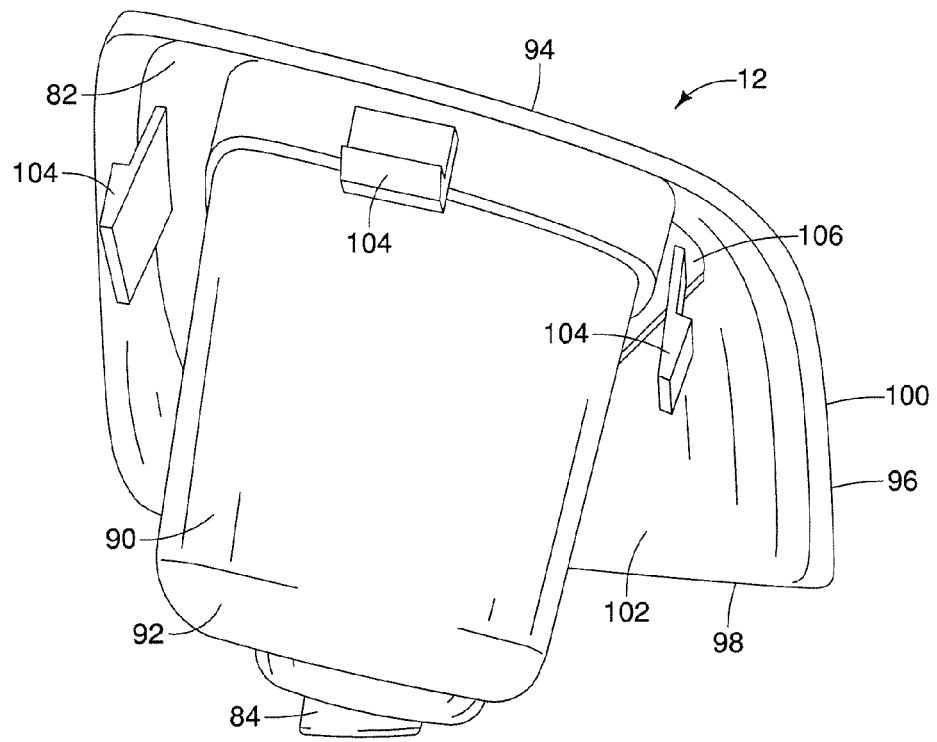
FIG. 16 is a rear elevation view of the pull cup shown removed from the door, showing the main body of the pull cup, the attachment portion, two snap-fitting projections and the break-away portion in accordance with the one embodiment.
Figure 17:
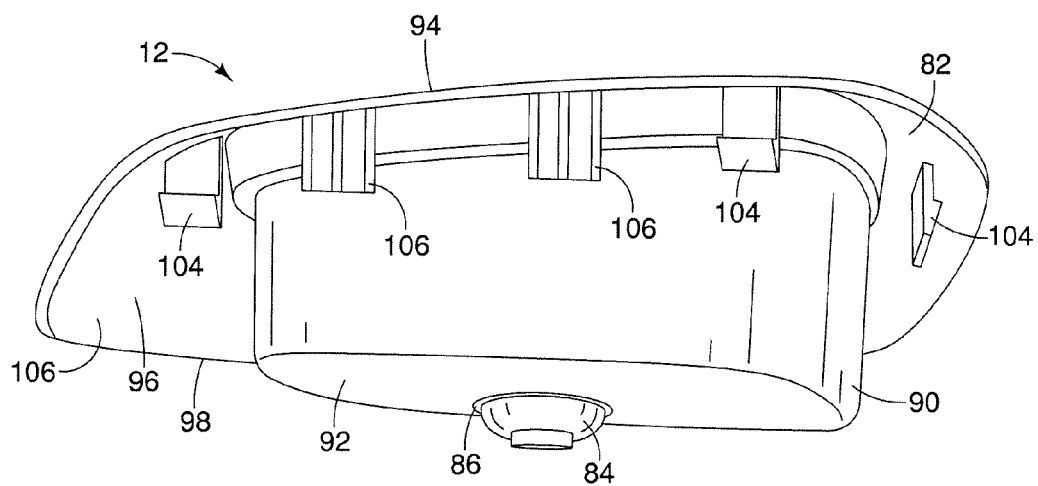
FIG. 17 is a side elevation view of the pull cup shown removed from the door, showing the main body of the pull cup, the attachment portion, several snap-fitting projections and the break-away portion in accordance with the one embodiment.
Figure 18:
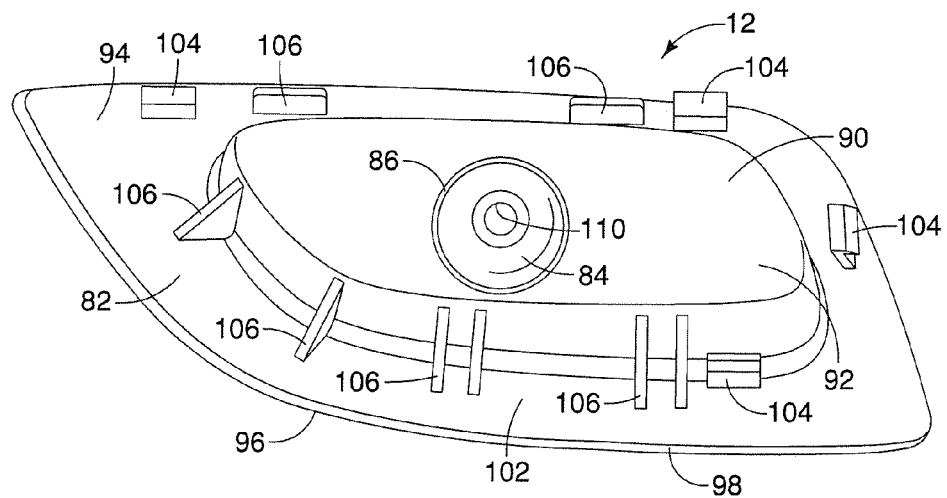
FIG. 18 is a bottom view of the pull cup shown removed from the door, showing a lower surface of the main body of the pull cup, the attachment portion, one of the snap-fitting projections and the break-away portion in accordance with the one embodiment.

As shown in FIGS. 16, 17 and 18, the inner surface 102 of the main body 82 of the pull cup 12 includes a plurality of snap fitting tabs 104 and support webs 106. The snap fitting tabs 104 are spaced apart around a periphery of the cup section 90. The support webs 106 are similarly spaced apart around the periphery of the cup section 90 to ensure rigidity of the pull cup 12.

As best shown in FIGS. 18 thru 21, the attachment portion 84 is an annular disk shaped section of the pull cup 12 that joins to the bottom 92 of the cup section 90 via the break-away portion 86. The attachment portion 84 includes a central aperture 110 that is provided to attach the pull cup 12 to the armrest 60 of the trim panel 50, as described further below.

The break-away portion 86 connects the main body 82 to the attachment portion 84. The break-away portion 86 is configured and arranged to release the main body 82 from the attachment portion 84 in response to a prescribed level of force F applied to at least one of the door 20, the trim panel 50 and/or the pull cup 12.

Figure 19:
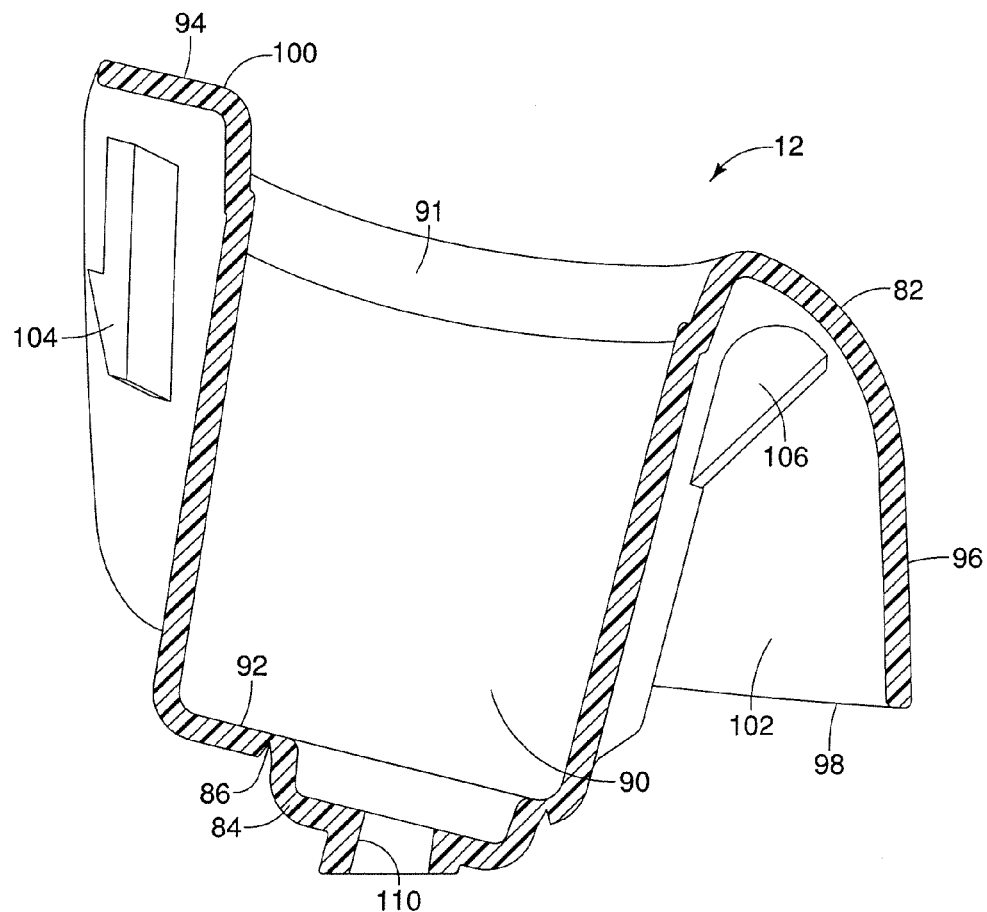
FIG. 19 is a cross-sectional view of the pull cup taken along the line 19-19 in FIG. 15, showing the main body of the pull cup, the attachment portion, and the break-away portion in accordance with the one embodiment.
Figure 20:
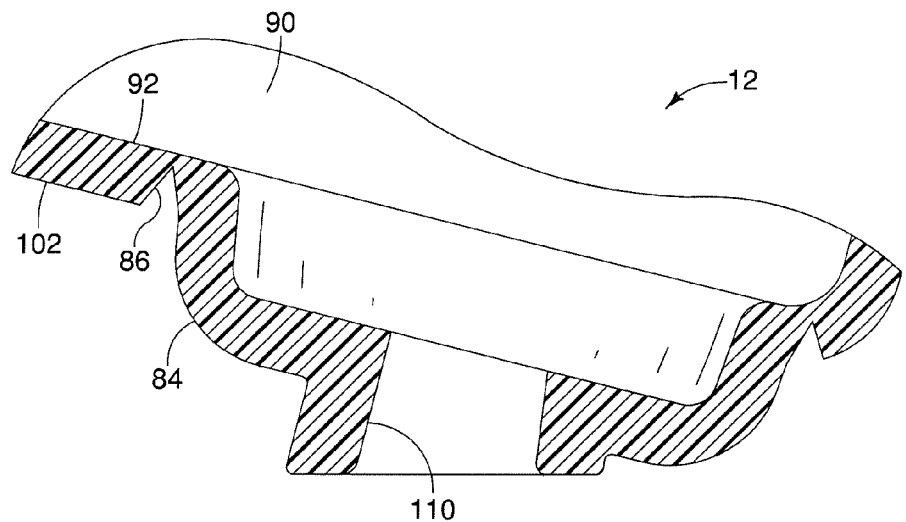
FIG. 20 is an enlarged cross-sectional view of a portion of the pull cup showing the break-away portion that connects the main body of the pull cup to the attachment portion in accordance with the one embodiment.
Figure 21:
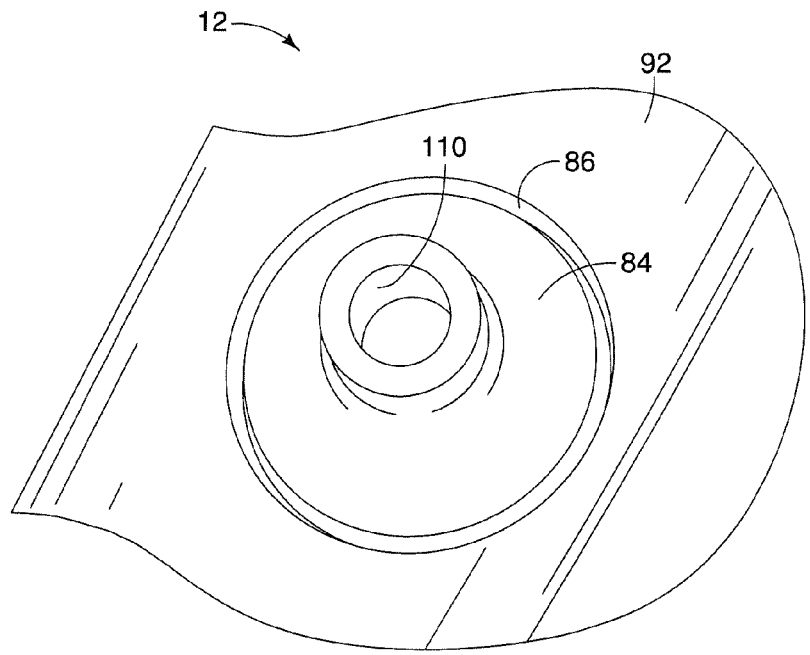
FIG. 21 is a perspective lower view of the pull cup showing the break-away portion that connects the main body of the pull cup to the attachment portion in accordance with the one embodiment.

The break-away portion 86 is basically a frangible seam with a smaller thickness as compared to those areas of the attachment portion 84 and the bottom 92 of the cup section 90 of the main body 82 adjacent the break-away portion 86. More specifically, the break-away portion 86 defines an annular shaped recess formed between the bottom 92 of the cup section 90 of the main body 82 and the attachment portion 84. As shown in FIG. 19, the annular shaped recess of the break-away portion 86 has a V-shaped or U-shapes cross-sectional outline. The break-away portion 86 is a reduced thickness and, consequently, a reduced strength portion of the bottom 92 of the pull cup 12. In response to a prescribed or predetermined amount of force, the break-away portion 86 breaks, severing the connection between the attachment portion 84 and the bottom 92 of the cup section 90 of the pull cup 12.

Figure 13:
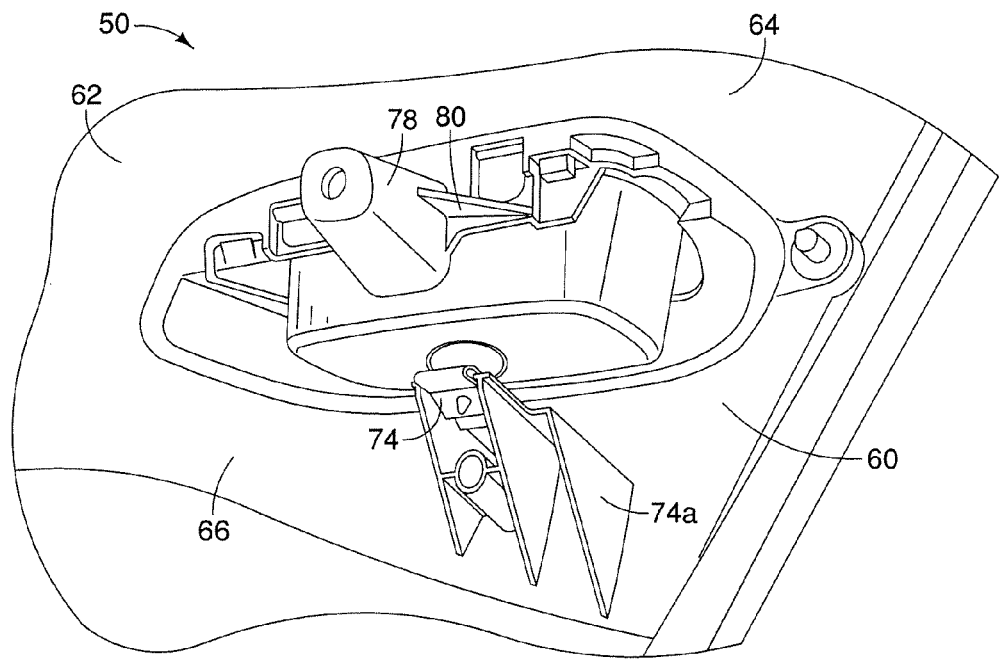
FIG. 13 is another perspective view of the interior surface of the trim panel similar to FIG. 12, with the pull cup installed, showing features within the armrest including the flange fixed to the pull cup, and the attachment flange used to attach the trim panel to the door in accordance with the one embodiment.
Figure 14:
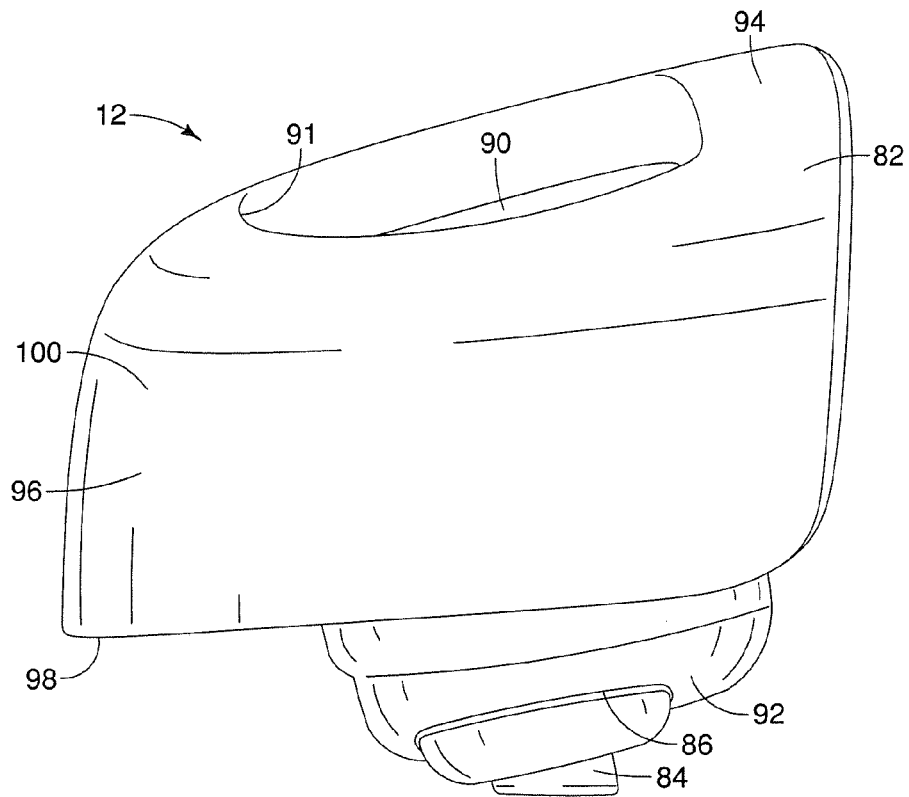
FIG. 14 is a front elevation view of the pull cup shown removed from the door, showing a front section of a main body of the pull cup, an attachment portion and a break-away portion that attaches the attachment portion to the main body of the pull cup in accordance with the one embodiment.
Figure 15:
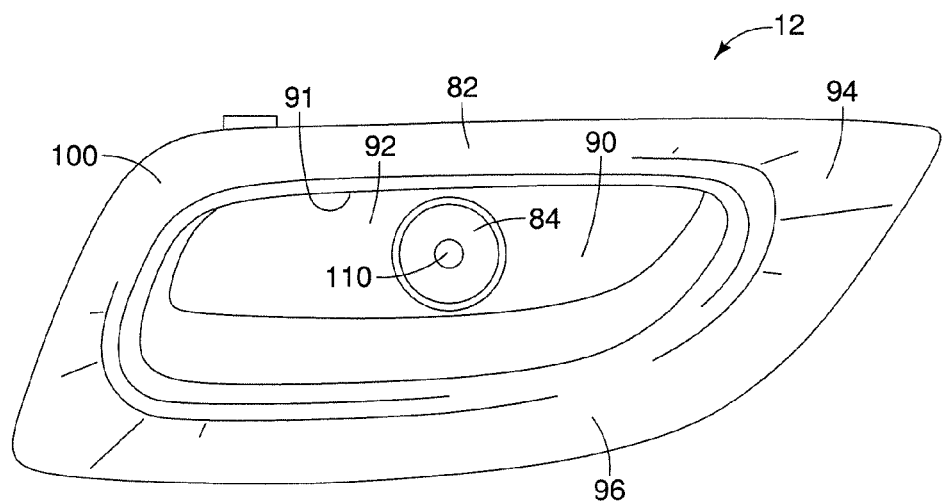
FIG. 15 is a plan view of the pull cup shown removed from the door, showing the main body of the pull cup, the attachment portion and the break-away portion (in phantom lines) in accordance with the one embodiment.

As shown in FIG. 9, a fastener $F_1$ extends through the aperture in the conically shaped attachment section 78 thereby rigidly attaching the armrest 60 of the trim panel 50 to the inner panel 32 of the door 20. Although not shown, there are other fasteners that fix the remainder of the trim panel 50 to the door 20 in a conventional manner. As shown in FIG. 10, the pull cup 12 is rigidly attached to the attachment bracket 74 of the armrest 60 by a fastener $F_2$. The fastener $F_2$ extends through the central aperture 110 of the attachment portion 84 and into a fastener receiving clip installed to the attachment bracket 74, as is shown in FIGS. 10 and 13. Thus, when a passenger pulls on the pull cup 12, the pulling force from the passenger is transmitted through the pull cup 12, the fastener $F_2$ and those portions of the pull cup 12 contacting the armrest 60 through the trim panel 50 to the door 12. More specifically, the pulling or door closing force from the passenger is transmitted through the pull cup 12, the conically shaped attachment section 78, the non-depicted fasteners, and the fastener $F_1$ to the door 20, thereby closing the door 20.

Figure 22:
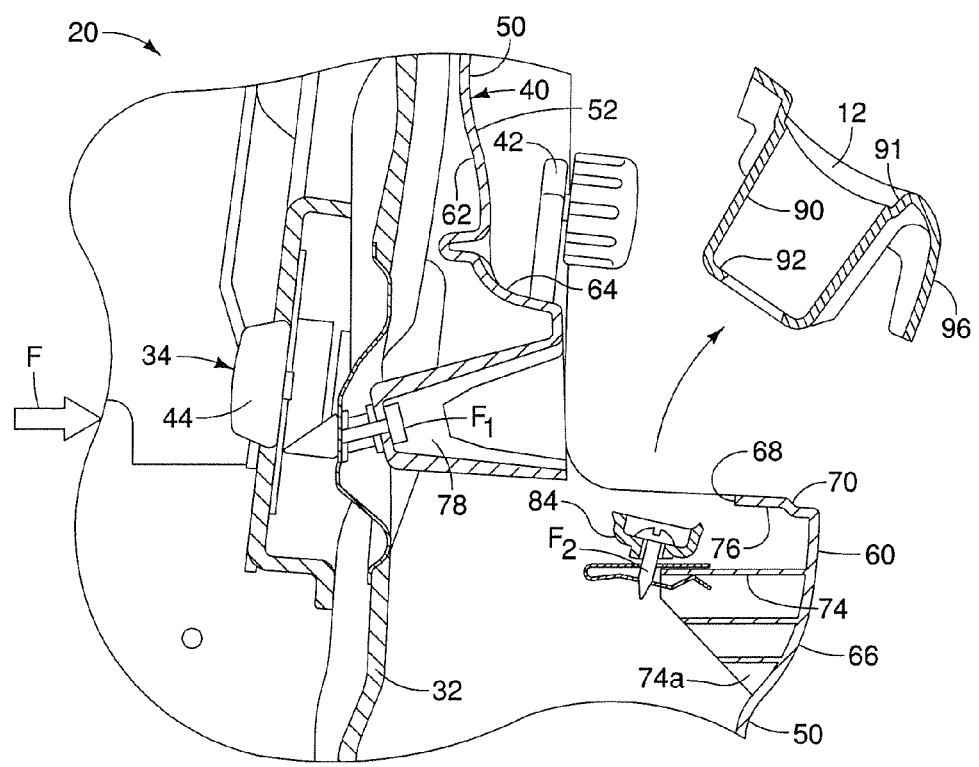
FIG. 22 is another cross-sectional view of a portion of the door similar to FIG. 10, showing the pull cup released from the attachment portion such that the pull cup is also released from the trim panel in accordance with the one embodiment.

As indicated in FIGS. 3 and 22, when impacting force F is applied to the door 20 and/or to the trim assembly 40 (e.g., when the outer surface of the outer panel 30 of the door is impacted from the side), the impacting force F can cause the break-away portion 86 to break, thus severing the connection between the pull cup 12 and the attachment portion 84. Thus, as shown in FIG. 22, the attachment portion 84 remains attached to the armrest 60 while the pull cup 12 is released. The direction and level of the impacting force F applied to the door 20 required to cause the break-away portion 86 to break is dependent upon combinations the angle and the amount of impacting force applied to the door 20 and/or the trim assembly 40. For example, a direct impacting force F, applied perpendicular to the outer surface of the outer panel 30 of the door 20, may only cause minor deformation of the outer panel 30, but may be of sufficient strength to cause the conically shaped attachment section 78 to deform the trim panel 50 sufficiently to cause the pull cup 12 to be released by the break-away portion 86. Further, impacting forces from directions other than from the side of the vehicle 10 may be sufficient to cause the pull cup 12 to be released by the break-away portion 86.

Since the trim panel 50 has a first flexural rigidity that is less rigid than the second flexural rigidity of the pull cup 12, slight deformation of the trim panel 50 may be sufficient to cause the pull cup 12 to be released by the break-away portion 86. However, the armrest 60 is provided with the curved side section 66, the recessed ledge 70 and the rib 76 that strengthen and add overall stiffness to the armrest 60. Hence, the armrest 60 has a flexural rigidity that is greater (more rigid) than other regions of the trim panel 50. However the armrest 60 has a flexural rigidity that is less than the flexural rigidity of the pull cup 12 (i.e., is more flexible than the pull cup 12).

In the depicted embodiment, the attachment portion 84 is attached to the armrest 60 and the trim panel 50. However, in an alternative embodiment, the attachment portion 84 can be directly fastened to the inner panel 32 of the door 20.

Further, in an alternative embodiment, the pull cup 12 can be tethered to the trim panel 50 by a string or strap. In such an alternative embodiment, such a tether limits the movement of the pull cup 12 when the pull cup 12 is released by the break-away the break-away portion 86. Consequently, in the presence of a tether, the pull cup 12 can be released by the break-away portion 86, but can only move a short distance away from the armrest 60.

There are various elements of the vehicle 10 that are conventional components that are well known in the art. Since these elements of the vehicle 10 are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle trim assembly. Accordingly, these terms, as utilized to describe the present invention should be interpreted relative to a vehicle equipped with the vehicle trim assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle trim assembly comprising:
an interior trim panel; and
a pull cup including a main body, an attachment portion and a break-away portion connecting the main body to the attachment portion, the attachment portion being fastened to the interior trim panel, and the break-away portion defining an annular shaped recess that surrounds the attachment portion and forms a boundary between the attachment portion and the main body, the break-away portion being configured and arranged to separate the main body from the attachment portion in response to a prescribed level of force applied to at least one of the interior trim panel and the pull cup.

2. The vehicle trim assembly according to claim 1, wherein the main body, the break-away portion and the attachment portion are integrally formed as a monolithic member.

3. The vehicle trim assembly according to claim 1, wherein the break-away portion includes a frangible seam with a smaller thickness as compared to areas of the main body and the attachment portion that are adjacent the break-away portion.

4. A vehicle trim assembly comprising:
an interior trim panel; and
pull cup including a main body, an attachment portion and a break-away portion connecting the main body to the attachment portion, the main body including a cup shaped receptacle having an upper opening and a bottom wall portion with the attachment portion located at a central section of the bottom wall portion, the attachment portion being fastened to the interior trim panel, and the break-away portion being configured and arranged to separate the main body from the attachment portion in response to a prescribed level of force applied to at least one of the interior trim panel and the pull cup.

5. The vehicle trim assembly according to claim 4, wherein the break-away portion defines an annular shaped recess between the main body and the attachment portion.

6. The vehicle trim assembly according to claim 5, wherein the annular shaped recess has a V-shaped cross sectional outline.

7. The vehicle trim assembly according to claim 1, wherein the interior trim panel has a first flexural rigidity and the pull cup has a second flexural rigidity that is greater than the first flexural rigidity.

8. The vehicle trim assembly according to claim 1, wherein the attachment portion includes a fastener receiving opening with a fastener extending therethrough and securing the attachment portion to the interior trim panel.

9. The vehicle trim assembly according to claim 1, wherein the interior trim panel includes an arm rest section with a recessed section with the pull cup installed in the recessed portion.

10. The vehicle trim assembly according to claim 9, wherein
the pull cup includes a contoured outer surface shaped to conform to an outer surface of the arm rest of the interior trim panel.

11. A vehicle door assembly comprising:
a vehicle door panel;
an interior trim panel coupled to the vehicle door panel; and
a pull cup including a main body, an attachment portion and a break-away portion connecting the main body to the attachment portion, the attachment portion being fastened to at least one of the vehicle door panel and the interior trim panel, the main body including a cup shaped receptacle having an upper opening and a bottom wall portion with the attachment portion being recessed relative to the bottom wall portion, and the break-away portion surrounding the attachment portion and being configured and arranged to release the the bottom wall from the attachment portion in response to a prescribed level of force applied to at least one of the vehicle door panel, the interior trim panel and the pull cup.

12. The vehicle door assembly according to claim 11, wherein the main body, the break-away portion and the attachment portion are integrally formed as a monolithic member.

13. The vehicle door assembly according to claim 11, wherein the break-away portion includes a frangible seam with a smaller thickness as compared to areas of the main body and the attachment portion that are adjacent the break-away portion.

14. The vehicle door assembly according to claim 11, wherein the break-away portion defines an annular shaped recess between the main body and the attachment portion.

15. The vehicle door assembly according to claim 14, wherein the annular shaped recess has a V-shaped cross sectional outline.

16. The vehicle door assembly according to claim 11, wherein the interior trim panel has a first flexural rigidity and the pull cup has a second flexural rigidity that is greater than the first flexural rigidity.

17. The vehicle door assembly according to claim 11, wherein the attachment portion is located at a central section of the bottom wall portion.

18. The vehicle door assembly according to claim 11, wherein the attachment portion includes a fastener receiving opening with a fastener extending therethrough and securing the attachment portion to the interior trim panel.

19. The vehicle door assembly according to claim 11, wherein the interior trim panel includes an arm rest section with a recessed section with the pull cup installed in the recessed section.

20. The vehicle door assembly according to claim 19, wherein the pull cup includes a contoured outer surface shaped to conform to an outer surface of the arm rest of the interior trim panel.

* * * * *